G. W. ANDERSON.
VEHICLE WORK STAND.
APPLICATION FILED APR. 28, 1921.
1,398,057.
Patented Nov. 22, 1921.
2 SHEETS—SHEET 2.
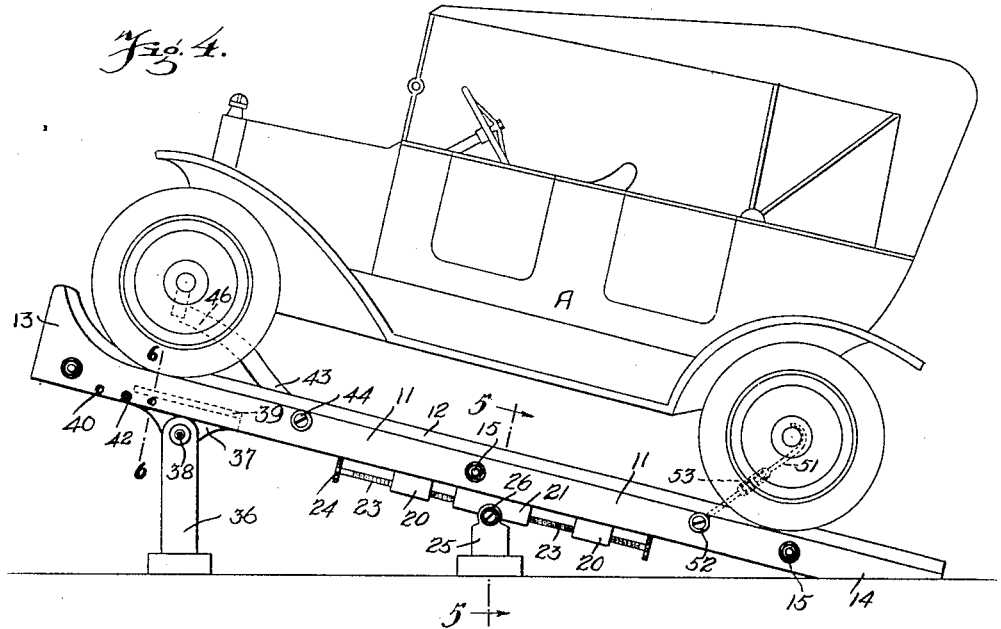
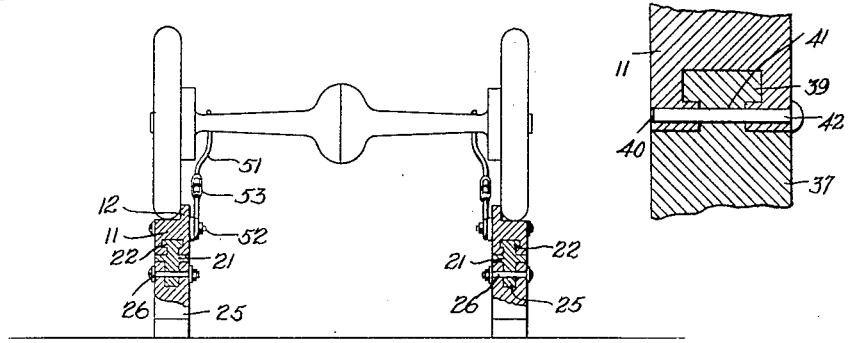
WITNESSES
INVENTOR
GEORGE W. ANDERSON
BY Munn & Co.
ATTORNEYS

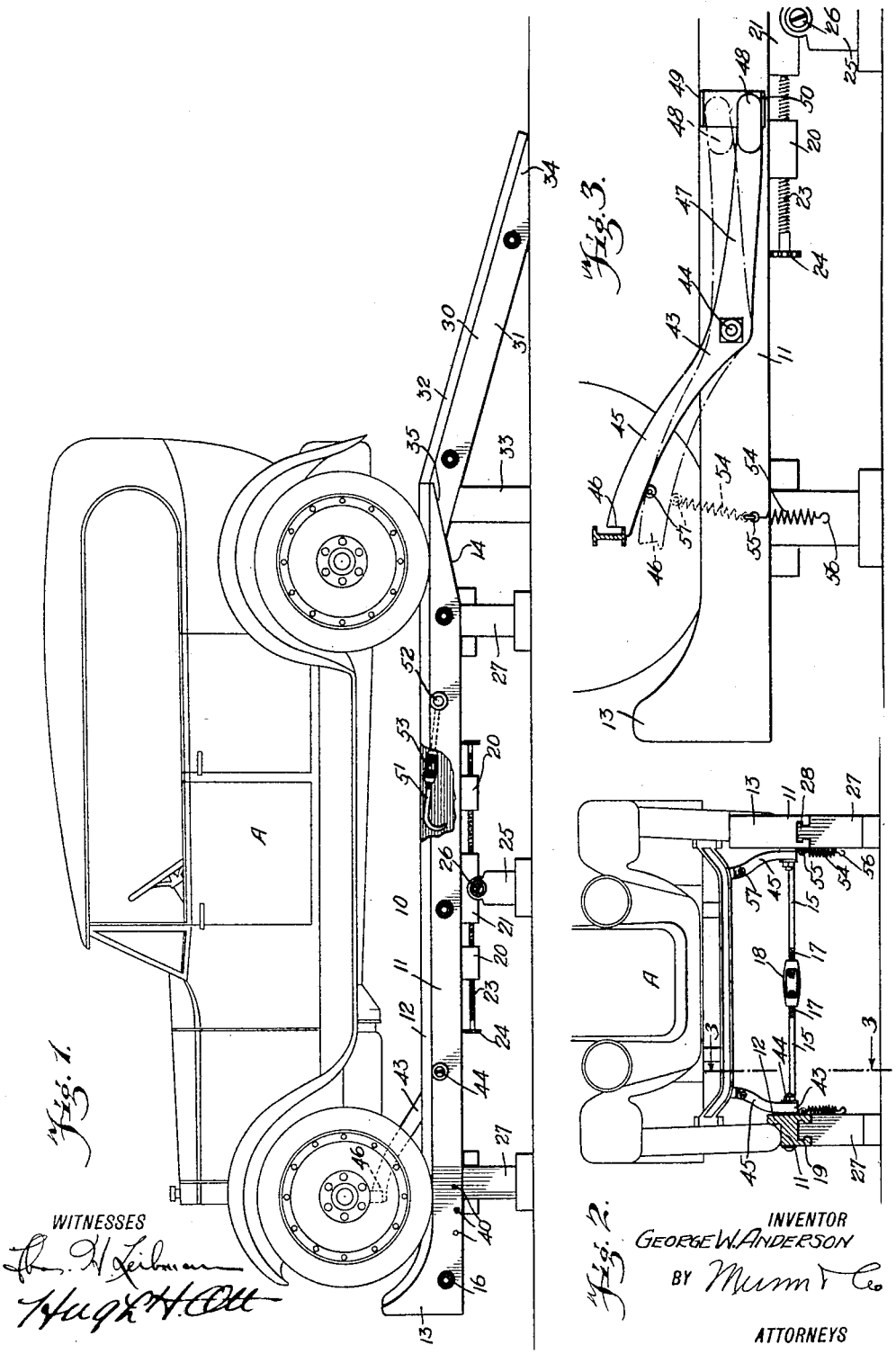

UNITED STATES PATENT OFFICE.

GEORGE WILLIAM ANDERSON, OF ELIZABETH, NEW JERSEY.

VEHICLE WORK-STAND.

1,398,057.  Specification of Letters Patent.  Patented Nov. 22, 1921.

Application filed April 28, 1921. Serial No. 465,093.

*To all whom it may concern:*

Be it known that I, GEORGE W. ANDERSON, a citizen of the United States, and a resident of Elizabeth, in the county of Elizabeth and State of New Jersey, have invented a new and Improved Vehicle Work-Stand, of which the following is a full, clear, and exact description.

This invention relates to a vehicle work-stand and is particularly designed for supporting motor vehicles in elevated relation with respect to the floor of a garage for effecting the repairs thereon.

The invention contemplates as one of its objects the provision of a work-stand which is adjustable to accommodate vehicles of various types and sizes whereby to meet the exigencies of the trade.

As a further object, the invention contemplates the provision of a work-stand for vehicles which is equipped with means for retaining the vehicle in place thereon, said means being rendered active automatically by the running of the vehicle thereupon, and means adapted to be associated with said retaining means for automatically releasing the same upon movement of the vehicle relative to said retaining means.

A still further object in view resides in the provision of a vehicle repair stand which includes a supporting frame having interchangeable supports adapted to be associated therewith for respectively supporting the frame in a horizontal plane or inclined planes at various inclinations.

Another object in view resides in the provision of a device of the character set forth, which is simple and safe, and readily adjustable to accommodate vehicles of various types and sizes.

With the above recited and other objects in view, the invention resides in the novel construction, combination and arrangement of parts set forth in the following specification, pointed out in the appended claims and illustrated in the accompanying drawings, it being understood the right is reserved to embodiments other than those actually illustrated herein, to the full extent indicated by the general meaning of the terms in which the claims are expressed and by variations in the phraseology of the same.

In the drawings—

Figure 1 is a side elevation of the work-stand illustrating the same arranged in a horizontal plane with a vehicle supported thereon.

Fig. 2 is a front end view thereof, partly in section.

Fig. 3 is an enlarged fragmentary longitudinal sectional view therethrough taken approximately on the line 3—3 of Fig. 2.

Fig. 4 is a side elevation of the work-stand illustrating the same arranged to support a vehicle in inclined position.

Fig. 5 is a transverse sectional view therethrough taken approximately on the line 5—5 of Fig. 4.

Fig. 6 is a sectional view taken on the line 6—6 of Fig. 4.

Referring to the drawings by characters of reference, the work-stand comprises a frame 10 which includes a pair of tread rails 11, each provided at its inner side edge with an upstanding flange 12. The forward extremity is provided with a stop or abutment 13 preferably formed integral with the tread rail. The rear under face of the rail is beveled upwardly and outwardly as at 14. The rails are adjustably connected to each other in spaced parallel relation by meanse of the rod sections 15—15, the outer threaded extremities of which are passed through openings in the rails and receive at the opposite sides thereof the nuts 16. The inner threaded extremities 17 are disposed in axial alinement and receive a turn-buckle 18 which serves to effect relative movements of said inner threaded ends toward or away from each other for the purpose of adjusting or varying the distance between the tread rails to coincide with the tread of the vehicle to be supported thereby. Each of the rails is formed on its under side with a T-shaped groove 19 and with spaced centrally arranged stationary bearing lugs 20—20. The block 21 is provided with a T-shaped tongue 22 arranged in the groove 19 between the bearing lugs and is adapted for longitudinal adjustments therebetween. Means is provided for effecting the adjustment of the block 21, said means being here illustrated as consisting of worm screws 23 threaded through the lugs 20 and abutting at their inner extremities with the block 21. The outer extremities of the worm screws are provided with manipulating heads 24. A supporting foot 25 is pivotally secured as at 26 to the block 21 to constitute a longitudinally adjustable fulcrum which supports the medial portion of each rail.

Referring particularly to Figs. 1, 2 and 3 of the drawings, in which the stand is arranged to support the vehicle A in a horizontal plane, end supporting feet 27 are employed, each of which is provided with a T-shaped head 28 for detachably associating the same with the tread rails. The tongues 28 of the end supporting feet are inserted in the groove at the opposite ends of the rails and serve to maintain the frame in a horizontal position. In order to provide means for running a vehicle up on to the stand when the same is arranged in a horizontal plane, an inclined approach 30 is provided consisting of a frame including side rails 31 having upstanding flanges 32 at its inner side edges. The rails are connected by rod sections and turn-buckles identical to those employed for connecting the tread rails of the stand 10. The inner end of each rail 31 is provided with a supporting foot 33 secured to the under side thereof and depending therefrom, while the forward extremity of the rail is beveled as at 34 to contact with the floor. The inner end of the rails 31 and flanges 32 are cut away as at 35 to snugly fit the beveled end 14 of the tread rails of the stand, any suitable means being employed for connecting the inner end of the approach to the vehicle support. The arrangement of the stand in a horizontal plane as heretofore described is especially useful for the heavier types and larger sizes of vehicles.

Referring to the arrangement of the stand illustrated in Figs. 4 and 5 of the drawings, which arrangement is preferable for the lighter types and smaller sizes of vehicles, the support is here illustrated as arranged at an inclination. To accomplish this, the end supporting feet 27 are removed and the frame is swung on the pivot 26 to bring the beveled extremities of the rails 11 into contact with the ground. In order to support the elevated extremity of the stand, a supporting foot 36 is employed, the same being provided with an angularly adjustable head 37 pivoted thereto as at 38. The head 37 is provided with a T-shaped tongue 39 which is arranged in the T-shaped groove 19 on the under side of the rail. The rail is provided with a plurality of transverse openings 40 and the tongue 39 with an aperture 41 which is designed to be registered with the openings 40 to receive a retaining pin 42 for the purpose of maintaining the head 37 in its longitudinally adjusted positions with respect to the rail. It is, of course, understood that the abutment or stop 13 of the rails are disposed at the elevated extremity of the same and in this instance the vehicle is run directly on the floor on to the stand, the abutment or stop serving to prevent the running of the front wheels of the vehicle over the elevated end of the stand.

The means for engaging the vehicle to retain the same on the frame against accidental displacement consists of a pair of levers 43 pivoted as at 44 to the inner side of the rails adjacent the forward end of the frame. The forward arm 45 of each lever is of arcuate formation and is notched at 46 at its extremity to coact with the front axle of the vehicle. The rear arm 47 is provided with a weighted extremity 48 movable between the stop lugs 49 and 50 provided on the inner side of the rail. The weighted extremity 48 serves to normally elevate the arcuate arm 45 to dispose the same in the path of movement of the front axle of the vehicle when running the same on to the stand, and the arcuate arm 45 operates as a cam surface with which the vehicle axle will coact to depress the notched extremity and allow the axle to pass thereover. When the axle has passed beyond the notched extremity 46 the weighted extremity will return the notched extremity to normal position, thereby disposing the same in the path of movement of the axle to retain and prevent the backing of the vehicle from the support until the notched extremity has been depressed.

As an additional safety means for retaining the vehicle on the support, retaining hooks 51 are pivoted as at 52 to the inner sides of the rails 11 adjacent the rear end of the frame, said hooks being adjustable in length by means of the turn-buckle 53 whereby they may be regulated to properly coact with the rear axle of the vehicle.

In order to provide means for automatically effecting the release of the retaining levers, a coiled spring 54 is attached at one extremity as at 55 to the inner side of each rail and is provided at its opposite extremity with a hooked terminal 56 and the extremity of the arm 45 of the lever is provided with an eye 57. In operation, when the vehicle is to be removed from the stand, the hooked terminal 56 of the spring is engaged with the eye 57 of the lever and the motor is started and driven slightly forward to relieve the notched extremity 46 of the lever of its frictional contact therewith. The spring 54 will immediately effect the depression of the notched extremity against the action of the weight 48 and permit the machine to be driven rearwardly off of the support.

It will thus be seen that a vehicle repair or work-stand is provided which will serve to support a vehicle in elevated relation with respect to the floor whereby workmen may gain access to the under side thereof for the purpose of making repairs thereon. It will be further observed that various means of adjustment have been provided for to accommodate the support to vehicles of various types and sizes in which the adjustments may be readily and quickly made to meet with the exigencies of the trade.

Having thus described my invention, what I claim is:

1. In a vehicle repair stand, a frame including tread rails having adjustable connection therebetween for the accommodation of vehicles having various tread widths, adjustable and interchangeable means for respectively supporting the frame in horizontal or inclined planes, and means automatically operable by the movement of the vehicle up on to the stand to effect the retention of the same thereof against displacement therefrom.

2. In a vehicle repair stand, a frame including tread rails having adjustable connection therebetween for the accommodation of vehicles having various tread widths, adjustable and interchangeable means for respectively supporting the frame in horizontal or inclined planes, and gravity actuated means adapted for engagement with the vehicle upon movement of the same up on to the stand for retaining the vehicle against displacement therefrom.

3. In a vehicle repair stand, a frame including tread rails having adjustable connection therebetween for the accommodation of vehicles having various tread widths, adjustable and interchangeable means for respectively supporting the frame in horizontal or inclined planes, gravity actuated means adapted for engagement with the vehicle upon movement of the same up on to the stand for retaining the vehicle against displacement therefrom, and means carried by the stand and adapted to be engaged with the gravity means for automatically effecting the release of said gravity means upon movement of the vehicle in a forward direction.

4. In a vehicle repair stand, a frame including tread rails and means automatically operable by the movement of the vehicle upon the stand to effect the retention of the same thereon against displacement therefrom, comprising an angular arm pivoted to each tread rail having one extremity disposed in the path of movement of the vehicle axle for depression thereby, and means for normally moving said arm to dispose said extremity in the path of movement of the vehicle whereby the same will coact and engage with the vehicle axle after the passage of the same thereover to prevent retrograde movement of the same.

GEORGE WILLIAM ANDERSON.